United States Patent [19]

Imatomi

[11] Patent Number: 4,991,710
[45] Date of Patent: Feb. 12, 1991

[54] STRUCTURE OF OVERLAPPING PORTIONS IN APRON CONVEYOR

[75] Inventor: Toshio Imatomi, Toyonaka, Japan

[73] Assignee: Tsubakimoto Bulk Systems Corporation, Osaka, Japan

[21] Appl. No.: 467,886

[22] Filed: Jan. 22, 1990

[30] Foreign Application Priority Data

Aug. 10, 1989 [JP] Japan .................... 1-93375[U]

[51] Int. Cl.⁵ .......................... B65G 17/10
[52] U.S. Cl. ...................... 198/822; 198/819
[58] Field of Search ............ 198/818, 819, 822

[56] References Cited

U.S. PATENT DOCUMENTS 1,854,334  4/1932  Jensen et al. ............. 198/822
3,374,880  3/1968  Hohl ........................ 198/822
4,840,269  6/1989  Anderson ................. 198/822

Primary Examiner—H. Grant Skaggs
Assistant Examiner—Keith L. Dixon
Attorney, Agent, or Firm—Flynn, Thiel, Boutell & Tanis

[57] ABSTRACT

An apron conveyor having a chain formed by a plurality of elongated links. Each link has a forward end pivotally connected to a rearward end of an adjacent link. An apron member is fixed to each link. Each apron member includes a base plate having a front end portion on one apron member overlapping a rear end portion of an adjacent apron member. The front end portion has a bottom concave surface generated about a pivot axis defined at the forward end of the respective link. The rear end portion includes a rear damlike wall which projects outwardly from the base wall and terminates in a free end adapted for sliding movement along the adjacent concave surface. The rear end portion also includes a front damlike wall projecting outwardly from the base wall and terminating in a free end which is disposed for sliding movement along the same concave surface.

4 Claims, 2 Drawing Sheets

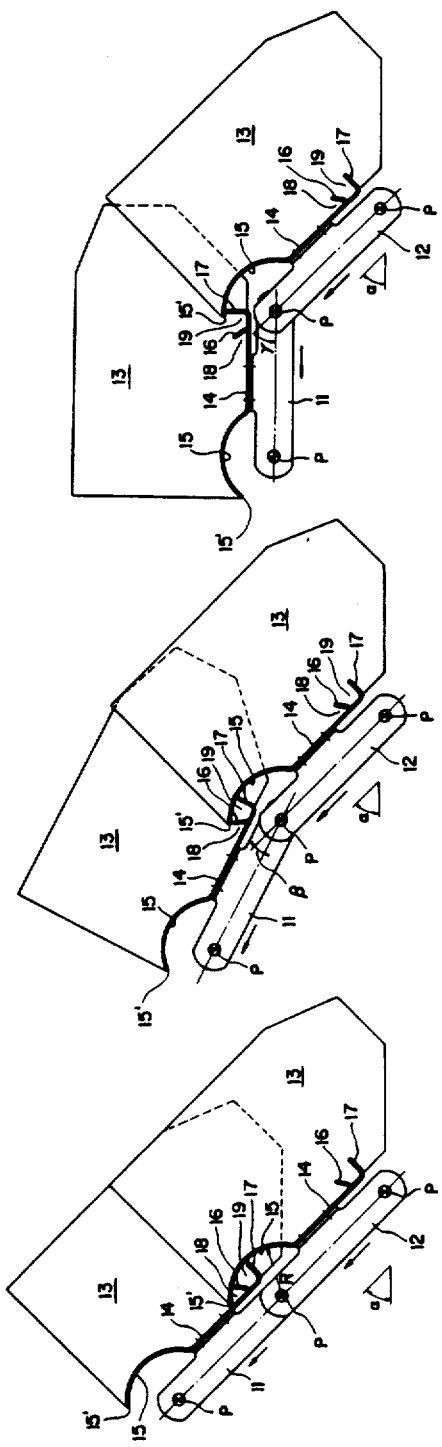

STRUCTURE OF OVERLAPPING PORTIONS IN APRON CONVEYOR

FIELD OF THE INVENTION

This invention relates to a structure of overlapping portions in a so-called apron conveyor. An apron conveyor comprises a plurality of interconnected links each of which is provided with an apron including a bottom plate and a pair of side plates. Specifically, the invention relates to an apron conveyor suitable for conveying powdery and/or granular material along an upwardly inclined path.

BACKGROUND OF THE INVENTION

In an apron conveyor in which powdery or granular material is conveyed along an upwardly inclined path, it is necessary to provide means for preventing the conveyed material from coming out through the gap between the overlapping front and rear end portions of adjacent aprons. Such a means is disclosed in, for example, Japanese Patent Application Laid-open No. 101308/1986, as shown in FIGS. 2(a), 2(b) and 2(c) hereof.

Namely, an apron E is mounted to each link 1a, 1b, . . . of a conveyor chain 1 and comprises bottom plates E1, E2 . . . and outwardly projecting side plates S1, S1, S2, S2 . . . Each link 1a, 1b . . . is pivotably connected with adjacent links by means of connecting pins P. The overlapping front end portion of the bottom plates E1, E2 . . . is formed of a trapezoidal shape so as to have a flat top 2, a proximal end leg 3 and a free end leg 4. On the other hand, the overlapping rear end portion of the bottom plate includes a circular wall 5 which is complimentary to the movement locus of the free end 4' of the end leg 4 as generated about the pivot axis defined by the connecting pin P, a recess 6 adjacent to and above said circular wall 5, and an upright free end 7.

When the links 1a and 1b are straight as shown in FIG. 2(a) with no bending angle about the connecting pin P on a conveying path having an angle of inclination α, the forward end 4' of the front overlapping end portion of the apron's bottom plate E2 is in contact with the forward end of the circular wall 5 of the forward apron E1. Thus, downward entering of the conveyed material from the forward apron E1 into the space 8 formed by the respective overlapping end portions of the forward and rearward aprons as mentioned above may be prevented. And when the links 1a and 1b make an angle β as shown in FIG. 2(b), the forward end 4' of the front overlapping end portion of the bottom plate E2 is adapted to make a sliding contact with the outer surface of the circular wall 5 about the connecting pin P until it reaches the other end of the circular wall 5; and accordingly, no gap may be created between the forward end 4' and the circular wall 5 which many allow the conveyed material to enter thereinto. Should a small amount of the material enter the space 8, it will be held in the recess 6 and is incapable of going over the upright free end 7.

As the bending angle increases to γ as shown in FIG. 2(c) so that the forward link 1a becomes substantially horizontal, the forward end 4' of the overlapping end portion of the bottom plate E2 is separated from the circular wall 5 and the space 8 is opened. However, since the forward bottom plate E1 is almost horizontal, there is no fear that the conveyed material enters the space 8 from the forward bottom plate E1. And as the forward link 1a further advances so as to incline downward, the material which may have accumulated in the space 8 may be discharged onto the forward bottom plate E1.

In the aforementioned prior art, the forward end 4' formed in the front overlapping end portion of the bottom plate is forced to make a sliding contact with the circular wall 5 formed in the rear end portion of the adjacent bottom plate, thus jamming the material in the gap as the relative bending of the links takes place, which causes wear of the sliding portions. This can cause the gap between the forward end 4' and the circular wall 5 to become larger, which in turn makes it easy for a larger amount of material to pass through the gap. Therefore, complete prevention of leakage of the conveyed material is not possible by the above-mentioned prior art.

Accordingly, this invention relates to an apron-type conveyor which is believed to significantly improve upon and overcome the deficiencies of the prior art conveyor.

SUMMARY OF THE INVENTION

The present invention provides a structure of overlapping portions in an apron conveyor wherein a, plurality of aprons are connected to links of a conveyor chain, and the front and rear ends of said aprons are overlapped with the respective rear and front ends of the adjacent aprons. A cover portion is formed in the front end of the bottom plate of each apron having a circular inner surface, the center of which coincides with the axis of an adjacent connecting pin as located at the front end of the respective link. A front weir plate and a rear weir plate are formed in the rear end of the bottom plate, and the free end of the former is adapted to slidingly contact the circular inner surface on the adjacent apron. The circular inner surface has a length such that the front end thereof is adapted to contact the upper surface of the adjacent bottom plate when the angle of bending in relation to the forward link is zero, and the inner surface cooperates with the front weir plate to form a front chamber and cooperates with the rear weir plate to form a rear chamber. The front chamber may be opened when the forward end of the circular surface is separated from the upper surface of the adjacent bottom plate, as the angle of relative bending between adjacent links increases. The rear chamber may be opened as the angle of relative bending further increases. The inner surface is adapted to contact the free end of the rear weir plate when the forward link becomes substantially horizontal with the angle of relative bending being a maximum.

When the two adjacent links are straight, namely the angle of relative bending is zero, and on an ascent, the free ends of the front and rear weir plates of the forward link are adapted to contact the circular inner surface of the adjacent rearward link; and the forward end of the circular surface is made to contact the upper surface of the bottom plate of the forward apron. Should a small amount of the conveyed material on the bottom plate of the forward apron flow downward to enter the gap between the bottom plate and the forward end of the circular inner surface, the material is stopped by the front weir plate; and once an angle of repose is formed in the front chamber, no further intrusion of the material may occur.

Consequently, the material may not be accumulated such that it reaches the gap between the free end of the font weir plate and the circular inner surface, thereby eliminating the fear of jamming the material therein.

Also, as relative bending takes place between the forward and adjacent rearward links, the forward end of the circular inner surface is separated from the upper surface of the bottom plate of the forward apron causing the material to fully occupy the front chamber, which will neutralize the intrusion prevention function by means of the angle of repose. However, even if the material enters the rear chamber by flowing over the top of the front weir plate, it may be stopped by the rear weir plate so as to form an angle of repose, thereby preventing further intrusion of the material into the rear chamber.

As the forward link further pivots relative to the adjacent rearward link so as to become substantially horizontal, the free end of the rear weir plate is situated near the forward end of the circular inner surface. However, since the bottom plate of the forward apron is almost horizontal, downward movement of the material cannot occur. Moreover, since the angle of repose formed within the rear chamber may be kept, there is no fear that the material may escape from the gap between the free end of the rear weir plate and the circular inner surface.

Owing to the above-mentioned structure and function, even if the conveyed material moves downward to the overlapping portions during upward conveyance, the possibly escaped material may be retained within the chambers so as to form an angle of repose below the level of the gap formed between the free ends of the weir plates and the circular inner surface. Thus, during the sliding contact between the free ends of the weir plates and the circular inner surface while conveyance of the material is effected, the material may not be jammed into the gaps. This lessens the degree of possible wear of the free ends of the weir plates as well as the circular inner surface, ensuring a longer service life. Also, squeaking sounds may be eliminated since the jamming of the conveyed material may not occur as mentioned above, ensuring quieter operation of the conveyor.

BRIEF DESCRIPTION OF THE DRAWINGS

FIG. 1(a) illustrates a section of the apron conveyor according to the present invention in which the adjacent two links are straight;

FIG. 1(b) shows a similar section when the two links are bent relative to each other; and FIG. 1(c) illustrates a similar section when the forward link is horizontal.

DETAILED DESCRIPTION

Figure 2A:
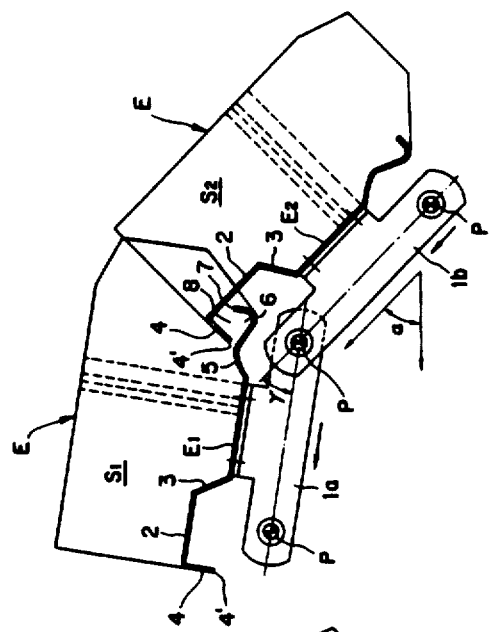
FIGS. 2(a) to 2(c) illustrate a prior art conveyor in positions corresponding to FIGS. 1(a) to 1(c), respectively.
Figure 2B:
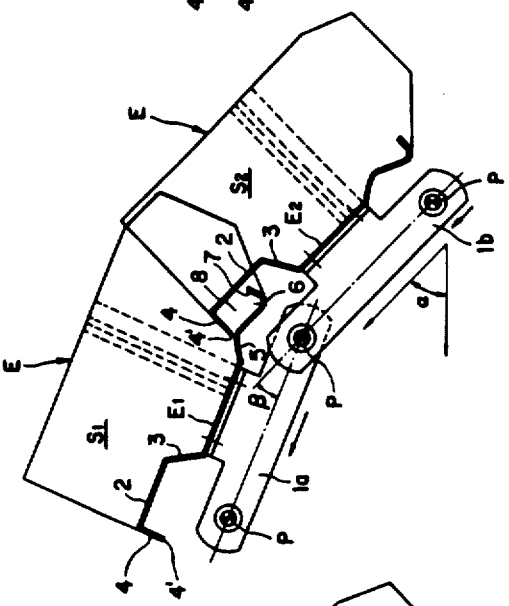
Figure 2C:
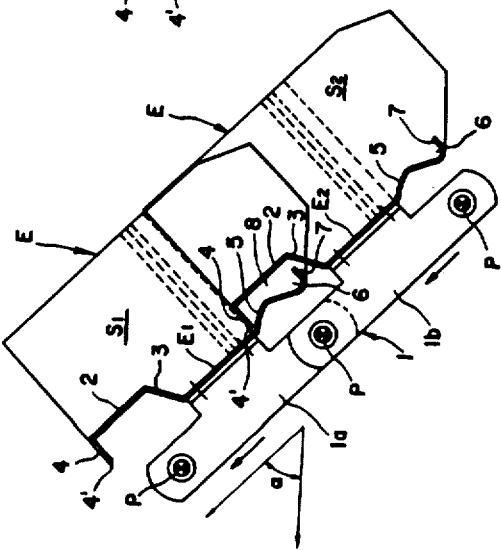

FIGS. 1(a) to 1(c) illustrate a conveyor according to the present invention when the forward link 11 and the adjacent rearward link 12 are in non-bent, half bent and maximum bent positions, respectively. A plurality of such links are interconnected by means of connecting pins P so as to form a so-called apron conveyor chain. To each link is mounted an apron 10 of generally U-shaped configuration having a pair of outwardly projecting side plates 13, 13 joined by a bottom plate 14. An arcuate cover portion 15 is formed at the overlapping front end portion of the bottom plate 14 so as to have an arcuate circular concave or inner (i.e. bottom) surface 15' which is generated by a radius having a center which coincides with the axis of the adjacent connecting pin P. At the overlapping rear end portion of the bottom plate 14, a front weir plate 16 and a rear weir plate 17 are formed and project outwardly such that the free ends of these two weir plates slidingly contact the circular inner surface 15' of the adjacent apron. The free end 15" of the circular cover portion 15 is adapted to lightly contact the upper surface of the bottom plate 14 of the forwardly adjacent apron when the two links 11, 12 are straight as shown in FIG. 1(a); and in this state, a front chamber 18 is formed by the circular surface 15' and the front weir plate 16; and a rear chamber 19 is formed between the front weir plate 16 and the rear weir plate 17. In the maximum bent state as shown in FIG. 1(c), only the free end of the rear weir plate 17 contacts the circular surface 15'; and the front and rear chambers are opened.

Therefore, in the state of FIG. 1(a), even if the conveyed material may enter into the gap between the forward end 15" of the circular inner surface 15' and the bottom plate 14, once an angle of repose has been formed, no further intrusion of the material may occur. Whereas, in the state of FIG. 1(b), the front chamber 18 is opened; and the material enters the front chamber 18; and the angle of repose collapses.

Thus, even if the material enters the rear chamber 19 through the gap between the free end of the front weir plate 16 and the circular inner surface 15', the escaped material may be retained by the rear weir plate 17; and once an angel of the repose has been formed, no further material may enter the rear chamber 19.

Consequently, in the state of FIG. 1(a), once an angle of repose has been formed in the front chamber 18, the material may reach the gap between the forward end 15" of the circular inner surface 15' and the bottom plate 14 so as to block the gap. However, the material may not accumulate to such an extent that it reaches the gap between the front weir plate 16 and the circular inner surface 15'. Thus, the material may not be jammed in the gap.

Similarly, in the state of FIG. 1(b) wherein an angle of repose has been formed in the rear chamber 19, the material may block the gap between the free end of the front weir plate 16 and the circular inner surface 15' so as to stop further intrusion of the material into the rear chamber 19; and the material may not reach the gap formed between the rear weir plate 17 and the circular inner surface 15'. This would ensure that no material may be jammed in the gap.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apron conveyor comprising:
  a plurality of aprons individually connected to links of a conveyor chain, and front and rear end portions of said aprons being overlapped with the respective rear and front end portions of adjacent aprons;

a cover portion formed in the front end portion of a bottom plate of each said apron and having a partial circular inner surface generated about a center which substantially coincides with the position of a connecting pin located at the front end of the respective link;

a front weir plate and a rear weir plate formed in the rear end portion of the bottom plate, a free end of the front weir plate being adapted to slidingly contact said circular inner surface;

said circular inner surface having a length such that a free front end thereof is adapted to contact an upper surface of the bottom plate of the forwardly adjacent apron when the angle of bending between adjacent links is zero and a front chamber is formed between the circular inner surface and a front side of the front weir plate and a rear chamber is formed between the front and rear weir plate;

said front chamber being opened when the front end of said circular inner surface is separated from said upper surface of said bottom plate, as the angle of the relative bending between adjacent links increases;

said rear chamber being opened as the angle of relative bending between adjacent links further increases; and said circular inner surface in the vicinity of the free end thereof being adapted to contact the free end of said rear weir plate when the forward link becomes substantially horizontal with the angle of relative bending between adjacent links being a maximum.

2. In an apron-type conveyor having an elongate endless conveyor chain formed by a plurality of elongated links, each said link having a forward end thereof pivotally connected about a pivot axis to a rearward end of a forwardly adjacent link, and an apron member fixed to and carried by each said link, said apron member including an enlarged base wall adapted to support material thereon and having front and rear end portions positioned such that the front end portion on one apron member overlaps the rear end portion of a forwardly adjacent apron member with the rear end portion being disposed between the overlapping front end portion and the links, comprising an improvement wherein the front end portion has an arcuate bottom concave surface which is generated approximately about the pivot axis defined at the forward end of the respective link, and wherein the rear end portion includes a base part which constitutes a rearward extension of the base wall, said rear end portion including a rear damlike wall which projects outwardly from said base part generally toward the respectively adjacent concave surface and terminating in a free end which is disposed so as to be closely but slidably movable relative to the respectively adjacent concave surface, said rear end portion also including a front damlike wall projecting outwardly from said base part in forwardly-spaced relationship from said rear damlike wall and terminating in a free end which is disposed so as to be closely but slidably movable relative to the respectively adjacent concave surface.

3. A conveyor according to claim 2, wherein said base wall is defined as a generally enlarged and substantially planar platelike member having said front end portion projecting forwardly from one edge thereof and having said front and rear damlike walls projecting transversely relative thereto adjacent a rear edge thereof.

4. A conveyor according to claim 3, wherein each said apron member has a pair of sidewardly-spaced side walls which are joined to said base wall and project outwardly therefrom in a direction away from the respective said link, said front and rear damlike walls extending between said side walls.

* * * * *